(12) United States Patent
Wu (10) Patent No.: US 7,487,471 B2
(45) Date of Patent: Feb. 3, 2009

(54) USER INTERFACE FOR CONFLICT RESOLUTION MANAGEMENT

(75) Inventor: Yuh-Cherng Wu, San Jose, CA (US)

(73) Assignee: SAP AG, Walldorf (DE)

( * ) Notice: Subject to any disclaimer, the term of this patent is extended or adjusted under 35 U.S.C. 154(b) by 670 days.

(21) Appl. No.: 10/897,829

(22) Filed: Jul. 23, 2004

(65) Prior Publication Data

US 2006/0020359 A1 Jan. 26, 2006

(51) Int. Cl.
*G06F 3/00* (2006.01)
(52) U.S. Cl. ........................ 715/866; 715/764; 715/761; 715/762; 715/810; 715/792
(58) Field of Classification Search ................. 715/530, 715/764, 781, 792, 866, 511, 744, 762, 804, 715/861, 743, 230, 211
See application file for complete search history.

(56) References Cited

U.S. PATENT DOCUMENTS

| | | | |
|---|---|---|---|
| 5,444,851 A * | 8/1995 | Woest ........................ 709/222 |
| 5,463,735 A * | 10/1995 | Pascucci et al. ............. 709/222 |
| 5,581,754 A | 12/1996 | Terry et al. |
| 5,696,966 A | 12/1997 | Velarde |
| 5,806,074 A | 9/1998 | Souder et al. |
| 5,806,078 A * | 9/1998 | Hug et al. ................... 715/205 |
| 5,809,499 A | 9/1998 | Wong et al. |
| 5,867,169 A * | 2/1999 | Prater .......................... 345/604 |
| 5,884,072 A * | 3/1999 | Rasmussen ................. 709/223 |
| 5,940,821 A | 8/1999 | Wical |
| 6,085,187 A | 7/2000 | Carter et al. |
| 6,088,706 A * | 7/2000 | Hild ........................... 707/202 |
| 6,236,987 B1 | 5/2001 | Horowitz et al. |
| 6,240,410 B1 | 5/2001 | Wical |
| 6,442,566 B1 | 8/2002 | Atman et al. |
| 6,446,924 B1 | 9/2002 | Olson |
| 6,449,624 B1 * | 9/2002 | Hammack et al. ........... 707/203 |
| 6,665,681 B1 | 12/2003 | Vogel |
| 6,704,729 B1 | 3/2004 | Klein et al. |
| 6,748,381 B1 | 6/2004 | Chao et al. |
| 6,839,699 B2 | 1/2005 | Chan |

(Continued)

OTHER PUBLICATIONS

CASEVersion/Clearcase User's Guide, by John Ponser, document No. 007-2369-001/ Published: Jul. 21, 1994.*

(Continued)

*Primary Examiner*—Sy D. Luu
*Assistant Examiner*—Linh K Pham
(74) *Attorney, Agent, or Firm*—Mintz, Levin, Cohn, Ferris, Glovsky & Popeo, P.C.

(57) ABSTRACT

One implementation provides a method for providing a graphical user interface (GUI) that allows a user to view proposed modifications to a knowledge entity. The method includes displaying to the user a first representation of a first proposed modification to the knowledge entity, and displaying to the user a second representation of a second proposed modification to the knowledge entity, wherein the second representation is positioned in relation to the first representation to indicate whether a conflict exists between the first and second proposed modifications to the knowledge entity. If there is a visual indication of the conflict, the method further includes displaying a modified representation of the knowledge entity by applying either the first or the second proposed modification according to a user-adjustable decision criterion.

15 Claims, 6 Drawing Sheets

U.S. PATENT DOCUMENTS

| | | | |
|---|---|---|---|
| 6,850,944 | B1 | 2/2005 | MacCall et al. |
| 6,928,432 | B2 | 8/2005 | Fagan et al. |
| 7,076,736 | B2* | 7/2006 | Hugh ......................... 715/743 |
| 7,076,763 | B1* | 7/2006 | DeGroote et al. ............ 717/112 |
| 2002/0049738 | A1* | 4/2002 | Epstein ........................... 707/1 |
| 2002/0072928 | A1 | 6/2002 | Sundararajan |
| 2002/0138483 | A1 | 9/2002 | Bretl et al. |
| 2002/0161736 | A1 | 10/2002 | Beygelzimer et al. |
| 2003/0172368 | A1* | 9/2003 | Alumbaugh et al. ......... 717/106 |
| 2003/0182319 | A1 | 9/2003 | Morrison |
| 2003/0217335 | A1 | 11/2003 | Chung et al. |
| 2004/0083206 | A1 | 4/2004 | Wu et al. |
| 2004/0085345 | A1* | 5/2004 | Galou et al. ................. 345/734 |
| 2004/0205524 | A1* | 10/2004 | Richter et al. ............... 715/503 |
| 2004/0205653 | A1* | 10/2004 | Hadfield et al. ............. 715/530 |
| 2004/0261013 | A1* | 12/2004 | Wynn et al. .................. 715/511 |
| 2005/0005266 | A1* | 1/2005 | Datig ........................... 717/136 |

OTHER PUBLICATIONS

CASEVersion/Clearcase User's Guide, by John Ponser, document No. 007-2369-001/ Published: Jul. 21, 1994.*

Clifton, C. et al, "TopCat: Data Mining Topic Identification in a Text Corpus," Mar. 15, 2000, pp. 1-33, XP002296783.

Cooper, J. W. et al, "Lexical Navigation: Visually Prompted Query Expansion and Refinement," 1997, pp. 237-246, XP002265696.

Lin, S-H. et al, "Extracting Classification Knowledge of Internet Documents with Mining Term Associations: A Semantic Approach," Proceedings of the 21st Annual International ACM-SIGIR Conference on Research and Development in Information Retrieval, Melbourne, Aug. 1998, pp. 241-249, XP000825364.

Munroe, K. D. et al, "BBQ: A Visual Interface for Integrated Browsing and Querying of XML," Proceedings of the IFIP Working Conference on Visual Database Systems, May 2000, 15 pages, XP002167785.

Staab, S. et al, "Semantic Community Web Portals," Computer Networks, vol. 33, No. 1-6, Jun. 2000, pp. 473-491, XP004304786.

Lam et al. "Resolving Executing-Committing Conflicts in Distributed Real-Time Database Systems," *The Computer Journal*, 1999, vol. 42, No. 8, pp. 674-692.

James "Track Changes to a Microsoft Word Document" *Swarthmore College Information Technology Services*, Feb. 2002, 5 pages.

http://www.mobilepipeline.com/showArticle.
jhtml?articleID=18200355—"Mobilizing Database-Driven Applications" Feb. 11, 2004, 6 pages.

http://www.shaunakelly.com/word/trackchanges/
HowTrackChangesWorks.html —How Does Track Changes in Microsoft Word Work?, printed from the Internet on Jul. 16, 2004, 17 pages.

* cited by examiner

USER INTERFACE FOR CONFLICT RESOLUTION MANAGEMENT

TECHNICAL FIELD

This application relates to user interfaces in computing systems.

BACKGROUND

In an enterprise system, various different client devices may communicate with a host server. For example, in an enterprise communication system, various cellular telephones or personal digital assistants (PDA's) may communicate with a host server. Users of these cellular devices typically provide input that is routed to the host server. For example, a user may schedule an electronic appointment or create an e-mail that is then routed to and processed by the host server. The host server may include a knowledge repository, or database system, that is updates when the host server receives input from a mobile device. Over time, the host server may receive input from many different mobile devices and be required to make a series of different modifications to information contained within the knowledge repository.

SUMMARY

Various implementations are provided herein. One implementation provides a method for providing a graphical user interface (GUI) that allows a user to view proposed modifications to a knowledge entity. The method includes displaying to the user a first representation of a first proposed modification to the knowledge entity, and displaying to the user a second representation of a second proposed modification to the knowledge entity, wherein the second representation is positioned in relation to the first representation to indicate whether a conflict exists between the first and second proposed modifications to the knowledge entity. If there is a visual indication of the conflict, the method further includes displaying a modified representation of the knowledge entity by applying either the first or the second proposed modification according to a user-adjustable decision criterion.

Various implementations may provide certain advantages. For example, a host server may provide a decision-supporting tool in a graphical user interface (GUI) for use by a knowledge engineer to visualize conflicts and inconsistencies between modifications proposed by at least two different clients, such as mobile devices. While an overview of the conflicts may be observed, the knowledge engineer can further use the tool to drill down to view detailed information about the proposed modifications provided by the clients. The tool also allows the knowledge engineer to control several decision criteria to interactively adjust the display of the proposed modifications.

The details of one or more implementations are set forth in the accompanying drawings and the description below. Other features, objects, and advantages will be apparent from the description and drawings, and from the claims.

DETAILED DESCRIPTION

Figure 1:
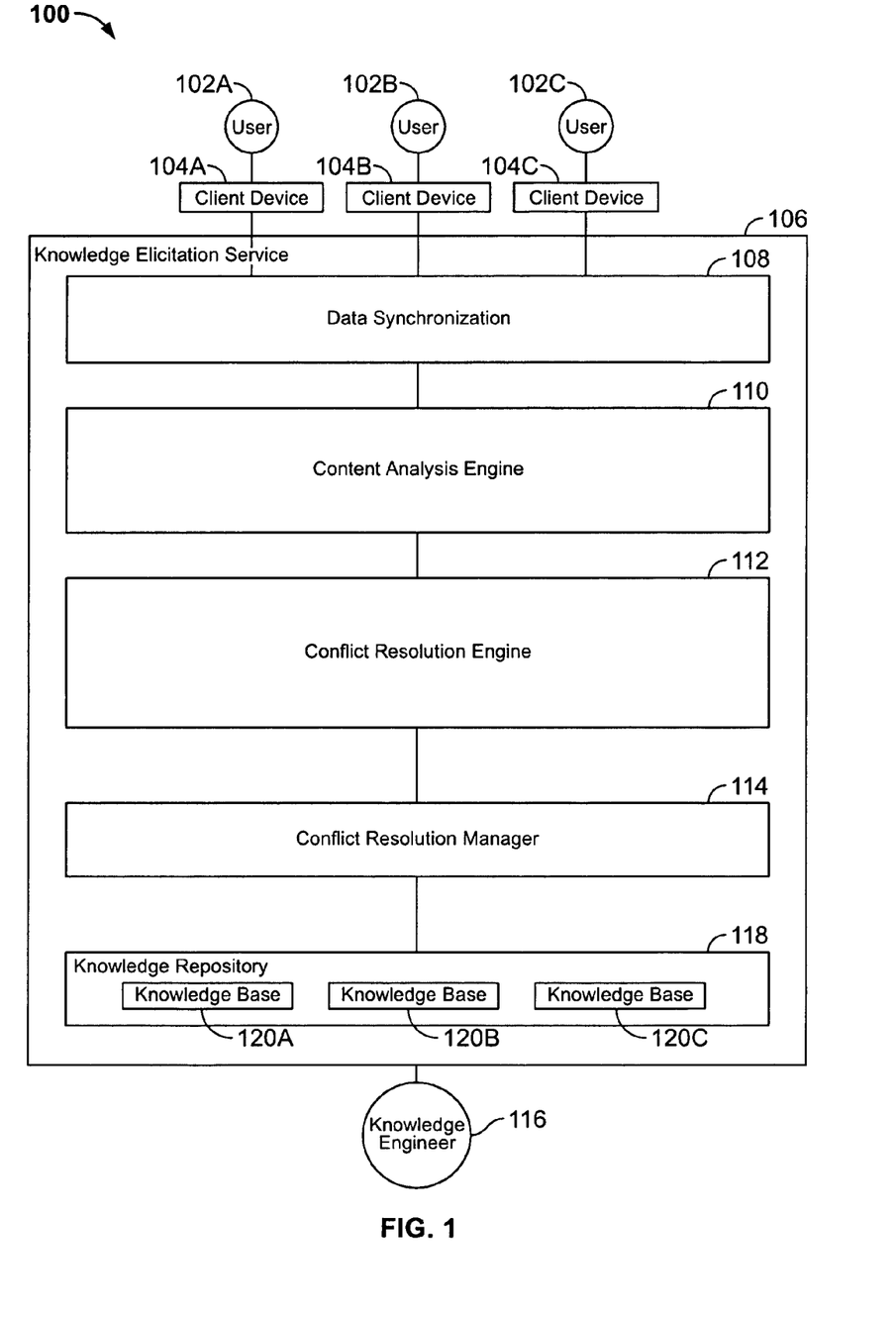
FIG. 1 is a block diagram of a system having a host server that is capable of resolving conflicts raised by users of client devices when modifying information contained within a knowledge repository, according to one implementation.

FIG. 1 is a block diagram of a system 100 having a host server 106 that is capable of resolving conflicts raised by users 102A, 102B, 102C of client devices 104A, 104B, 104C when modifying information contained within a knowledge repository 118, according to one implementation. In the system 100, various users 102A, 102B, and 102C use client devices 104A, 104B, and 104C, respectively. These client devices 104A, 104B, and 104C are each coupled to the host server 106 using a network connection, such as a wireless connection. When one of the users 102A, 102B, or 102C provides input information to a corresponding client device 104A, 104B, or 104C, this information is then routed to the host server 106. For example, the user 102A, who may be a field engineer or a service technician, may want to update information that is contained on both the client device 104A and also on the host server 106. If the user 102B also wants to update information that is contained on the host server 106, the host server 106 may have to resolve a conflict based upon the information received from the different client devices 104A and 104B when determining how to update information contained in its knowledge repository 118. In one implementation, the host server 106 provides a graphical user interface (GUI) that is displayed to a knowledge engineer 116 when conflicts arise. The knowledge engineer 116 may use the GUI to view and manage such conflicts.

Each of the client devices 104A, 104B, and 104C contain a local knowledge repository, according to one implementation. These local knowledge repositories each contain one or more knowledge bases to store various forms of information. Typically, an individual knowledge base contains a specific type of information. For example, a knowledge base may contain product, customer, service history, contract, or procedural information. If the user 102A is a field engineer or service technician, the knowledge repository on the client device 104A may contain a product knowledge base, a customer knowledge base, a service history knowledge base, or the like. When traveling or visiting with customers, the user 102A is able to use the client device 104A and access information contained within the local knowledge repository.

When any of the client devices 104A, 104B, or 104C sends information to the host server 106, the information is processed by a data synchronization element 108. The data synchronization element 108 uses a set of configurable rules to determine when and how incoming information is to be processed by the host server 106. For example, these rules may specify that the host server 106 will process any incoming information every six hours using a clock running on the host server 106. At the end of a six-hour cycle, the data synchronization element 108 checks for incoming information from the client devices 104A, 104B, and 104C and provides such information to the content analysis engine 110. In another implementation, the data synchronization element 108 may retrieve information from any client device 104A, 104B, or 104C whenever a client device is linked to the host server 106. After completing the synchronization, a rule may be used to check the client device 104A, 104B, or 104C every hour until the client device is unlinked from the host server.

The content analysis engine 110 analyzes the content of all information received by the host server 106 to determine if it will be processed. The content analysis engine 110 uses a set of configurable rules to make these determinations. For example, if any of the users 102A, 102B, or 102C have provided requests using their respective client devices 104A, 104B, or 104C to modify one or more of the knowledge bases 120A, 120B, and 120C in the knowledge repository 118 on the host server 106, the content analysis engine 110 may reject these requests if a rule specifies that the client devices 104A, 104B, and 104C do not have authority to modify the knowledge repository 118 at any time. Alternatively, the content analysis engine 110 may accept these requests if the rule specifies that the client devices 104A, 104B, and 104C have authority to modify certain types of information within the knowledge repository 118. For example, the rule may specify that the client devices 104A, 104B, and 104C are able to modify customer and/or service history information within the knowledge repository 118 but are not able to modify contract information.

In another scenario, the content analysis engine 110 may also accept and process requests from specific client devices 104A, 104B, and/or 104C based upon the characteristics of the users 102A, 102B, and/or 102C and other factors. For example, if the user 102A is a field technician having ten years of experience, or if the user 102A has interacted with hundreds of different customers within a year's timeframe, the content analysis engine 110 may determine that requests from the client device 104A will be processed. On the other hand, if the user 102B is a field technician having only one month of experience, the content analysis engine 110 may determine that requests from the client device 104B will not be processed.

In one implementation, the content analysis engine 110 creates and manages clusters that relate to the knowledge bases 120A, 120B, and 120C. Each knowledge base 120A, 120B, and 120C contains a number of knowledge entities, which may comprise electronic documents such as specific work orders, service history forms, customer profiles, or the like. The content analysis engine 110 may create and manage a series of clusters that are associated with these knowledge entities. For example, one cluster may be associated with multiple, related knowledge entities. In another example, a given knowledge entity may be associated with many different clusters. One cluster may be associated with a first portion of the knowledge entity, and another cluster may be associated with a second portion of the knowledge entity. Clustering functionality implemented by the content analysis engine 110 will be described in further detail below.

Requests that are to be processed are sent from the content analysis engine 110 to the conflict resolution engine 112. The conflict resolution engine 112 processes conflicting requests sent from at least two of the client devices 104A, 104B, and/or 104C. If the conflict resolution engine 112 receives only one request, the request may be directly processed. However, if the engine 112 receives two or more requests that conflict in some fashion, the engine 112 attempts to resolve the conflict. For example, the users 102A and 102B may want to modify a common electronic document within the knowledge repository 118 in conflicting ways. The conflict resolution engine 112 will receive two conflicting requests that are sent by the client devices 104A and 104B and will then determine which request to process. In one implementation, the engine 112 uses a set of rules to determine which request to process. For example, the engine 112 may determine to process the request that was initiated by a more experienced user. If a first request is initiated by the user 102A on the client device 104A, and if a second, conflicting request is initiated by the user 102B on the client device 104B, the engine 112 may determine to process the first request if the user 102A is more experienced than the user 102B.

In one implementation, the conflict resolution engine 112 uses an information, or weighted, value that has been computed to determine how to resolve a given conflict. This information value may be computed by the content analysis engine 110 or by the conflict resolution engine 112. A request associated with a higher information value is processed in favor of a request associated with a lower information value. For example, if a first request sent by the client device 104A is associated with a computed information value of "95" and a second, conflicting request sent by the client device 104B is associated with a computed information value of "85", the conflict resolution engine 112 will process the first request and reject the second request if a rule in the conflict resolution engine 112 specifies that any request with information value less than "90" is not considered. If the rule specifies a threshold of the information value as "80", both requests can, in one implementation, be further processed by the knowledge engineer 116 to make a final decision with the assistance from the conflict resolution manager 114. An information value associated with any given request is computed by using a set of rules. For example, the rules may specify that requests initiated by more experienced users, or by users who has interacted with many different customers over time, are to be associated with higher computed information values.

The conflict resolution manager 114 provides a graphical user interface (GUI) that displays potential conflicts to the knowledge engineer 116. The conflict resolution manager 114 works in conjunction with the conflict resolution engine 112 when conflicts are identified upon examination of incoming requests sent by the client devices 104A, 104B, and/or 104C. If any conflicts are identified by the conflict resolution engine 112, they are displayed to the knowledge engineer 116 by the conflict resolution manager 114. In addition, if the conflict resolution engine 112 and/or the conflict resolution manager 114 attempt to resolve a conflict using a set of predefined rules, the GUI may display to the knowledge engineer 116 one or more proposed resolutions to this conflict. In one implementation, the conflict resolution engine 112 may be capable of automatically resolving conflicts without any intervention or confirmation by the knowledge engineer 116. In this implementation, the conflict resolution manager 114 causes the GUI to display the actual resolutions selected by the conflict resolution engine 112.

The knowledge repository 118 contains a number of knowledge bases 120A, 120B, and 120C. Each knowledge base 120A, 120B, and 120C contains information of a different type. For example, the knowledge base 120A may contain product information, the knowledge base 120B may contain service history information, and the knowledge base 120C may include customer information. The information contained in the knowledge bases 120A, 120B, and 120C will generally be of use to the users 102A, 102B, and 102C when they interact with other individuals, such as customers. The client devices 104A, 104B, and 104C typically send requests to the host server 106 to modify the information contained in one or more of the knowledge bases 120A, 120B, or 120C. In one implementation, each client device 104A, 104B, and 104C contains local, customized versions of the knowledge bases 120A, 120B, and 120C. The client devices 104A, 104B, and 104C uses these local versions when they are not coupled to the host server 106 or when they determine to use the customized information contained in these local versions.

In one implementation, one or more of the client devices 104A, 104B, and 104C are mobile devices, such as cellular telephones or personal digital assistants (PDA's), which are coupled to the host server 106 using wireless connections. In one implementation, one or more of the client devices 104A, 104B, and 104C are coupled to the host server 106 using Internet, local area network (LAN), or wide area network (WAN) connections. For example, in a call-center environment, various call-center agents may use personal computers (PC's) as client devices that are coupled to the host server 106. During operation, these PC's may contain local knowledge repositories and may exchange information with the host server 106. When multiple PC's request conflicting modifications to be made to the knowledge repository 118, the conflict resolution manager 114 allows the knowledge engineer 116 to resolve such conflicts.

FIG. 2A through FIG. 2D are screen diagrams of a graphical user interface (GUI) 200 that allows a user to view and resolve conflicts, according to one implementation. In this implementation, the conflict resolution manager 114 manages the GUI and displays it to the knowledge engineer 116 shown in FIG. 1. The knowledge engineer 116 may interact with the GUI to change GUI contents or to trigger certain GUI functionality.

Figure 2A:
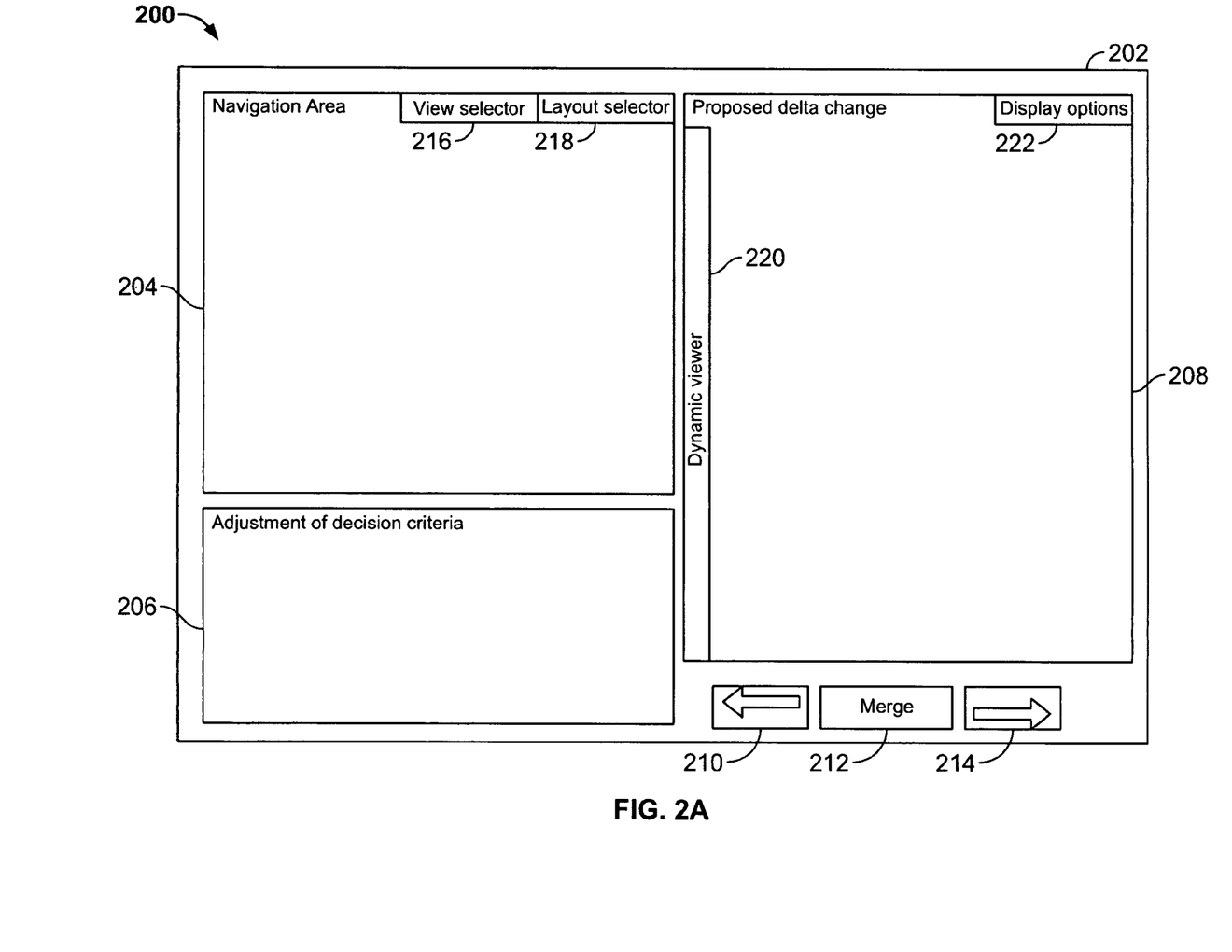
FIG. 2A through FIG. 2D are screen diagrams of a graphical user interface (GUI) that allows a user to view and resolve conflicts, according to one implementation.

As shown in FIG. 2A, the GUI 200 provides a window 202 that is displayed to the knowledge engineer 116. The window 202 includes various screen areas, including a navigation area 204, a criteria selection area 206, a modification display area 208, and buttons 210, 212, and 214. The navigation area 204 is capable of displaying a first representation of a first proposed modification to a knowledge entity and a second representation of a second proposed modification to the knowledge entity. The knowledge entity is contained in one or more of the knowledge bases 120A, 120B, and 120C. The first and second proposed modifications may be additions of information to, deletions of information from, or edits of information in the knowledge entity. The second representation is positioned to be grouped together with the first representation to indicate whether a conflict exists between the first and second proposed modifications to the knowledge entity and to further indicate that one proposed modification takes precedence over the other proposed modification based upon a user-adjustable decision criterion, such as an experience level of a particular user (e.g., the user 102A, 102B, or 102C). The knowledge engineer 116 may adjust the decision criterion in the criteria selection area 206. The modification display area 208 is capable of displaying a modified representation of the knowledge entity by applying the proposed modification having precedence. If there is no visual indication of a conflict between the first and second proposed modifications to the knowledge entity, the modification display area 208 is capable of displaying a modified representation of the knowledge entity by applying both the first and second proposed modifications. For example, if the first and second proposed modifications relate to non-overlapping or dissimilar additions of text, or if the first and second proposed modifications relate to distinct textual addition and deletion operations, then the modification display area 208 could display a modified representation of the knowledge entity based upon application of each of these proposed modifications.

Figure 2B:
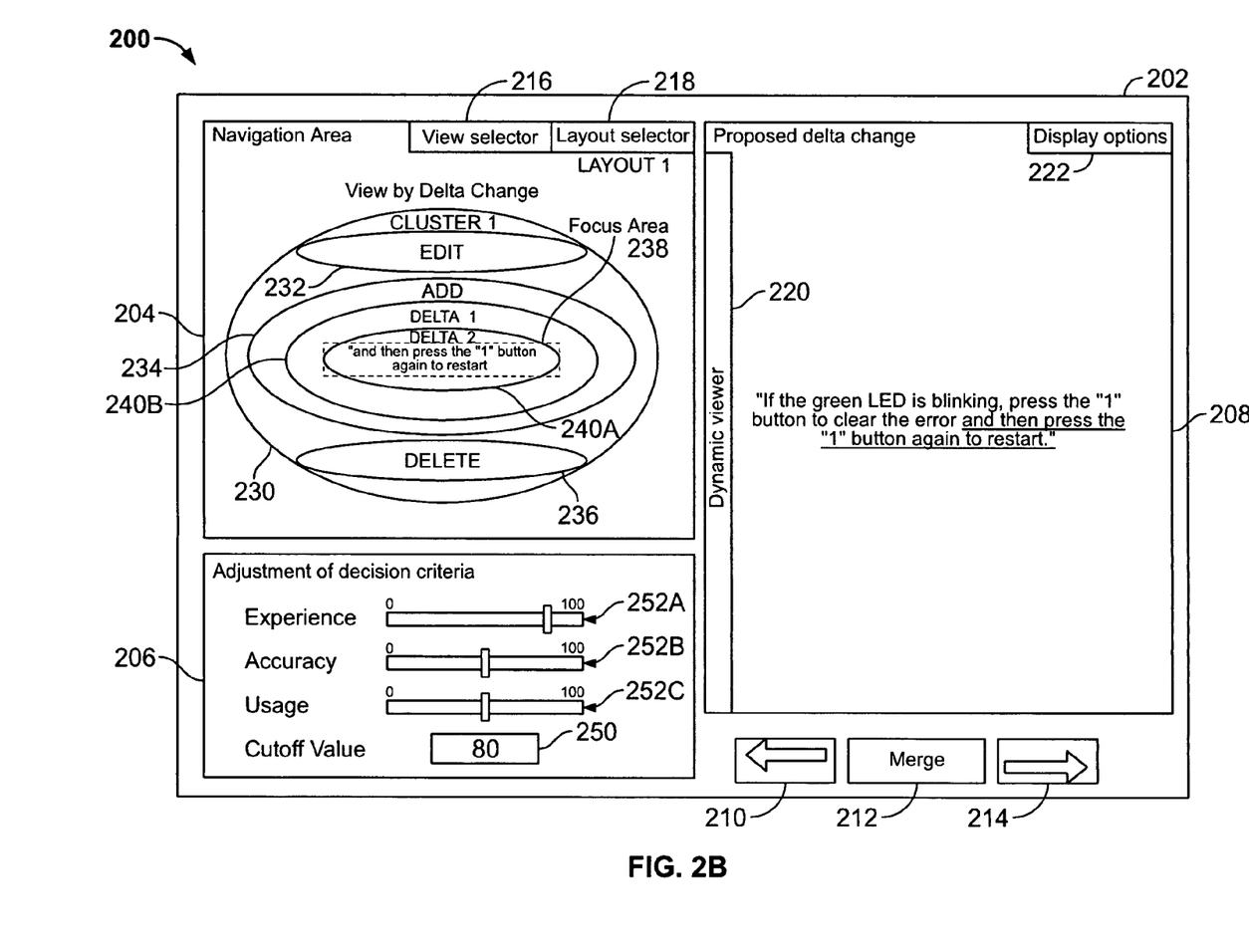

The navigation area 204 includes GUI elements 216 and 218, which are each menus as shown in the example of FIG. 2A. The knowledge engineer 116 may select the GUI element 216 to change a view format of the first representation of the first proposed modification to the knowledge entity and the second representation of the second proposed modification to the knowledge entity. For example, the knowledge engineer 116 may select one view from a menu of the GUI element 216 that displays the specific additions, deletions, or edits to the knowledge entity. The knowledge engineer 116 may also restrict the display of one or more knowledge entities identified in the same cluster by the content analysis engine 110 using the GUI element 216. The knowledge engineer 116 may select the GUI element 218 to change a layout format of the first representation of the first proposed modification to the knowledge entity and the second representation of the second proposed modification to the knowledge entity. For example, the knowledge engineer 116 may select one layout from a menu of the GUI element 218 that displays modifications to the knowledge entity in circular form, as shown in FIG. 2B. The knowledge engineer 116 may directly click on a delta change displayed in the navigation area 204 to view the change in the modification display area 208. The focused delta change is then highlighted in the modification display area 208 for review, according to one implementation.

The modification display area 208 includes a GUI element 222 and a dynamic viewer area 220. The knowledge engineer 116 may select a display option using the GUI element 222, which may comprise a menu. Various different display options are provided by the GUI element 222. Each display option corresponds to a specified manner of displaying the first representation of the first proposed modification, or delta change, to the knowledge entity and the second representation of the second proposed modification, or delta change, to the knowledge entity within the modification display area 208. For example, if the knowledge engineer 116 selects one display option, only the representation of the proposed modification having precedence will be displayed within the display area 208. If the knowledge engineer 116 selects another display option, both the first and second representations are each displayed in a separate color within the display area 208. The representation of the proposed modification having precedence can be prominently displayed in a predetermined color, such as red.

The dynamic viewer area 220 displays to the knowledge engineer 116 alternate views of the representations of the proposed modifications to the knowledge entity. In one implementation, each delta change made by a user 102A, 102B, or 102C may be displayed as a view-alternating button in the dynamic viewer area 220, so the knowledge engineer 116 may view changes for the individual user 102A, 102B, or 102C by simply click on the view-alternating button. The selection sequence of the buttons in the dynamic viewer area 220 may represent a priority list that can be used to propose an automatic merge of information into a knowledge entity. The knowledge engineer 116 may rearrange the priority list by adjusting the sequence of the view-alternating buttons, selecting from various options, to view all representations of proposed modifications in a specified order within the dynamic viewer area 220. The knowledge engineer 116 may also select more than one view-alternating buttons to see only those delta changes displayed in the modification display area 208. The knowledge engineer 116 may also specify the order within the dynamic viewer area 220. By doing so, the knowledge engineer 116 may have a better understanding of the contents displayed within the modification display area 208. In one implementation, the knowledge engineer 116 is capable of changing the size of the dynamic viewer area 220. The dynamic viewer 220 provides a tool for the knowledge engineer 116 to simulate and view a possible detailed modification by combining delta changes proposed by different users (such as the users 102A, 102B, and 102C).

The window 202 also includes buttons 210, 212, and 214. If the knowledge engineer selects the button 212, the proposed modifications displayed within the display area 208 are merged and stored into the appropriate knowledge bases 120A, 120B, and/or 120C. The knowledge engineer 116 may also navigate through modifications by using the buttons 210 and 214. The context and content of each modification made to the knowledge bases 120A, 120B, and/or 120C is stored within the host server 106. That is, each time the knowledge engineer 116 selects the button 212 to merge a specific modification to a knowledge entity into one or more of the knowledge bases 120A, 120B, and 120C, the context and content of each specific modification is stored by the host server 106. If the knowledge engineer 116 selects the button 210, a previous representation of the knowledge entity is displayed within the display area 208 that does not include application of the current, proposed modification. For example, two modifications (i.e., first and second delta changes) may have been made to a specific knowledge entity within the knowledge base 120A. If the display area 208 displays to the knowledge engineer 116 a third proposed modification (i.e., third delta change), the knowledge engineer may select the button 210 to view a representation of the second delta change to the knowledge entity within the display area 208, and may select the button 210 again to view a representation of the first delta change to the knowledge entity. The details of these delta changes may also be displayed within the navigation area 204 and the criteria selection area 206. The knowledge engineer 116 may then select the button 214 to view a representation of the second delta change to the knowledge entity within the display area 208. If the knowledge engineer 116 makes any changes within the criteria selection area 206 to alter the proposed modification displayed in the display area 208, the knowledge engineer 116 may then select the button 212 to merge a revised version of the second delta change to the knowledge entity within the knowledge base 120A. The knowledge engineer 116 may also make additional changes directly to the text displayed in the modification display area 208, according to one implementation. The changes made by the knowledge engineer 116 are merged into the revised version when the button 212 is selected.

In one implementation, the navigation area 204 includes a user-adjustable focus area to provide a focus to a representation of one of the proposed modifications to the knowledge entity, such that the focus is independent of the user-adjustable decision criterion specified within the criteria selection area 206. An example of such a focus area is shown in FIG. 2B and described in further detail below.

FIG. 2B shows a specific example of the types of information within the window 202 that can be displayed to the knowledge engineer 116. In this example, it is assumed that a given knowledge entity exists within the knowledge base 120A. The knowledge base 120A contains procedural information to assist field technicians when they visit customers. Each of the users 102A, 102B, and 102C shown in FIG. 1 are field technicians that use their respective client devices 104A, 104B, and 104C when they visit customers and service the home alarm systems for these customers. Many homeowners today have home alarm systems within their homes, and field technicians typically help these homeowners install and service their alarm systems. It is assumed that, in the example shown in FIG. 2B, each knowledge entity within the knowledge base 120A contains information to help the users 102A, 102B, and 102C install and service home alarm systems. These systems can often be quite complex, and inexperienced field technicians may often rely on the information provided by the knowledge entities contained within the knowledge base 120A in this example when working on these systems.

As described earlier, the content analysis engine 110 may create and manager clusters for the various knowledge entities contained within the knowledge bases 120A, 120B, and 120C. In the example shown in FIG. 2B, one such cluster is associated with one or more knowledge entities where portions of those knowledge entities contained delta changes of similar contents within the knowledge base 120A. Using the GUI element 216, the knowledge engineer 116 can restrict the view within the navigation area 204 to the cluster, named "Cluster 1", that is associated with the portion of one or more knowledge entities that deal with troubleshooting a particular problem on a home alarm system. Typically, a home alarm system has a control panel within a customer's home. The control panel has a number of different buttons and a number of lights, or light-emitting diodes (LED's). These LED's may include green and red LED's that indicate specific settings or problems. The specific, procedural text associated with "Cluster 1" of the knowledge entity is: "If the green LED is blinking, press the '1' button to clear the error." If a field technician is installing or servicing a home alarm system and sees the green LED blinking on the control panel, the technician may follow the instructions provided by this portion of the knowledge entity to clear the error. Such an error may occur if the alarm has malfunctioned, if the alarm is not configured properly, or the like.

As shown in FIG. 2B, the host server 106 has received two conflicting requests to modify information contained within "Cluster 1" of the knowledge entity. These conflicting requests have been provided by the client devices 104A, 104B, and/or 104C. The knowledge engineer 116 may view representations of the proposed modifications to the knowledge entity for these two requests within the navigation area 204. As shown, "Cluster 1" is represented by a large oval 230. The large oval 230 contains three smaller ovals 232, 234, and 236. Each of these smaller ovals 232, 234, and 236 corresponds to edits, additions, or deletions of information within the text for "Cluster 1". Because the "Cluster 1" is associated with text, all modifications can be classified as textual edits, additions, or deletions. In situations where a given cluster is associated with attributes or meta-information, smaller ovals corresponding to edits, additions, or deletions of the attributes or meta-information may also be used. A conflict can occur when two different proposed modifications overlap with each other and are dissimilar, according to one implementation. For example, if two proposed modifications wish to modify a common attribute or a common portion of text in different ways, a conflict can occur.

In one implementation, edits include partial deletions of information from "Cluster 1" and deletions include only full deletion of the information from "Cluster 1". In this implementation, any proposed deletion (represented within the oval 236) will conflict with another proposed edit (represented within the oval 232) or addition (represented within the oval 234). A proposed deletion will take precedence over another proposed edit or addition if the proposed deletion is associated with a higher information, or weighted, value than the other proposed edit or addition. The use of weighted values is described in more detail below.

Representations for conflicting, proposed modifications to "Cluster 1" are displayed within one of the smaller ovals 232, 234, and 236 corresponding to edits, additions, or deletions, respectively. As shown in FIG. 2B, two ovals 240A and 240B are shown within the oval 234. The ovals 240A and 240B are representations that correspond to two conflicting, proposed additions (delta changes) to the text associated with "Cluster 1". In this example, the first delta change includes the supplemental text "and then press the "0" button again to restart", and the second delta change includes the supplemental text "and then press the "1" button again to restart". These textual additions may have been proposed by the users 102A and 102B, for example, after they had visited customers' homes and serviced their home alarm systems. However, because the textual additions to "Cluster 1" conflict with each other, their representations 240A and 240B are shown within the oval 234.

According to one implementation, the representation for the proposed modification within a given category (e.g., edits, additions, deletions) having precedence, or which indicates a higher weight, is shown as the inner-most oval within the oval 234. In FIG. 2B, the oval 240A, which represents the second delta change, has a higher weighted value than the first delta change (represented by the oval 240B) according to one or more decision criteria that are specified in the selection area 206.

In the criteria selection area 206, the knowledge engineer 116 may select and specify various decision criteria that are used to calculate weighted values of various proposed delta changes that are represented within the navigation area 204. The relative positions of the ovals 240A and 240B indicate the weighted values of the corresponding delta changes that are represented by the ovals 240A and 240B. According to the example shown in FIG. 2B, the inner-most oval 240A represents the proposed delta change having the highest weighted value.

The criteria selection area 206 includes, for example, sliding bars 252A, 252B, and 252C, and further includes a text-entry field 250. Other presentations of adjustment tools can also be used in place of the sliding bars 252A, 252B, and 252C to adjust the various selection criteria. The knowledge engineer 116 is able to adjust the sliding bars 252A, 252B, and 252C using the GUI, and is also able to enter text into the field 250. The sliding bar 252A is associated with an experience level of a user, such as the user 102A, 102B, or 102C shown in FIG. 1. For example, the user 102A may be a field technician having three years of experience in servicing home alarm systems, while the user 102B may be a field technician having only one year of experience. In one implementation, the experience levels of the users 102A, 102B, and 102C are stored by the host server 106. When an individual request is sent by one of the users 102A, 102B, or 102C from one of the corresponding client devices 104A, 104B, or 104C, the host server 106 accesses the stored experienced level of the user 102A, 102B, or 102C. In another implementation, the client devices 104A, 104B, and 104C store experience levels and provide information relating to these levels to the host server 106.

The knowledge engineer 116 may adjust the sliding bar 252A to specify the importance, or weighting factor, of experience level as a decision criterion when calculating the weighted value of any proposed modification to "Cluster 1". If the knowledge engineer 116 adjusts the sliding bar 252A to "0", then the experience level of an individual user proposing a modification to "Cluster 1" of the knowledge entity will have no bearing on the calculation of the weighted value of the proposed modification. If, however, the knowledge engineer 116 adjusts the sliding bar 252A to "100", the experience level will be fully considered when calculating the weighted value of the proposed modification. The knowledge engineer 116 may also adjust the sliding bar 252A to any value between "0" and "100" to vary the weighting factor of the experience level criterion. In another implementation, the knowledge engineer 116 may use a text-entry field, rather than the sliding bar 252A, to specify the importance of a user's experience level. A user's experience level may be expressed as a concrete value (e.g., years, months, etc.) or as a category (e.g., very experienced, somewhat experienced, new, etc.). The host server 106 includes rules to determine the manner of expressing experience levels, according to one implementation.

The knowledge engineer 116 may also adjust the sliding bars 252B and 252C to adjust the relative importance, or weighting factors, of accuracy and usage decision criteria when calculating weighted values of proposed modifications to "Cluster 1". The accuracy criterion is based upon feedback that is received from a user, such as the user 102A, about "Cluster 1". For example, the user 102A may provide feedback that is sent by the client device 104A to the host server 106 that the information contained within "Cluster 1" is very accurate and has high value to the user 102A when servicing home alarm systems. To do so, the user 102A may provide such feedback by making a selection from a predetermined set of feedback options or by entering free-form text. The host server 106 then processes this feedback.

The usage criterion is based upon the use of the information contained within "Cluster 1" for the knowledge entity by a user, such as the user 102A. For example, the user 102A may access and use the information contained within "Cluster 1" many different times when servicing home alarm systems for different customers. Often, the user 102A accesses a localized version of this information that is contained on the client device 104A. The client device 104A then provides usage data relating to this information within "Cluster 1" to the host server 106.

When calculating an individual weighted value for a given proposed modification to "Cluster 1", the host server 106 processes the user's experience level, the accuracy, and the usage values corresponding to the proposed modification along with the weighting factors specified by the knowledge engineer 116 with the sliding bars 252A, 252B, and 252C. The host server 106 may normalize the values for experience level, accuracy, and usage before calculating the weighted value. For the example shown in FIG. 2B, it may be determined that the user 102A proposes the first delta change ("Delta 1") and has an experience level of five years. The user 102A may have used the information contained in "Cluster 1" fifteen times, and may have provided feedback that the information was very accurate and valuable. The host server 106 may normalize all of these to values between zero and one hundred. The host server 106 then uses the weighting factors specified by the settings of the sliding bars 252A, 252B, and 252C to calculate an overall weighted value between zero and one hundred. The weighting factors determine the relative weight of the experience, accuracy, and usage in calculating the overall weighted value. The overall weighted value is associated with the first proposed delta change. A second overall weighted value associated with the second proposed delta change ("Delta 2") is also calculated.

The oval 240A representing the second proposed delta change and the oval 240B representing the first proposed delta change are displayed within the oval 234 according to their associated weighted values. The oval 240A is displayed inside of the oval 240B, which indicates that the second proposed delta change has a higher weighted value that the first proposed delta change. The knowledge engineer 116 may further adjust the settings of the sliding bars 252A, 252B, and/or 252C to dynamically cause re-calculation of the weighted values associated with the first and second proposed delta changes. An oval representing a proposed delta change for a given category (e.g., edits, additions, deletions) having the highest weighted value is shown as the inner-most oval.

The knowledge engineer 116 may also specify a cutoff value between zero and one hundred within the text-entry field 250. Proposed modifications to "Cluster 1" that are associated with weighted values less than the specified cutoff value are not represented within the navigation area 204. Each of the first and second proposed delta changes shown in FIG.

2B that are represented by the ovals 240B and 240A, respectively, have associated weighted values that are greater than the specified cutoff value of "80". By adjusting the cutoff value in the field 250, the knowledge engineer 116 is able to filter out proposed modifications that will not be considered.

FIG. 2B illustrates a set of decision criteria for experience, accuracy and usage. Other decision criteria can also be configured by the knowledge engineer 116 during installation of the conflict resolution manager 114, according to one implementation. Furthermore, other decision models that have the capability of providing additional decision preferences can also be used to calculate the information, or weighted, values associated with proposed modifications. For example, one decision model may create a higher weighted value only if all decision criteria reach certain levels, and another decision model may create a high weighted value as long as one decision criterion has a high value.

The knowledge engineer 116 may also create and use a focus area 238 within the navigation area 204 to manage the display of ovals that represent proposed modifications to "Cluster 1". As shown in FIG. 2B, the knowledge engineer has created the focus area 238 within the GUI by drawing a rectangle (having dotted lines) around the oval 240A. As currently shown, the oval 240A is the inner-most oval and therefore is associated with a proposed modification (i.e., the second delta change, "Delta 2") having the highest weighted value. Any oval that is contained within the focus area 238 will remain within the focus area 238 regardless of subsequent adjustments made by the knowledge engineer to the sliding bars 252A, 252B, and 252C or to the cutoff value within the field 250. Therefore, even if the knowledge engineer 116 later makes such adjustments, the oval 240A will continue to be displayed within the focus area 238. The use of the focus area 238 allows the knowledge engineer 116 to manually retain representations of proposed modifications within the navigation area 204 while experimenting with the settings in the criteria selection area 206. At any time, however, the knowledge engineer 116 may move, resize, or delete the focus area 238. The delta change in the focus area will be highlighted in the modification display area 208, in one implementation.

The modification display area 208 displays to the knowledge engineer 116 the proposed modification associated with the highest weighted value as applied to "Cluster 1". As shown in FIG. 2B, the second delta change is associated with the highest weighted value, and therefore the text for the second delta change is applied to the current text for "Cluster 1". By viewing all of the text shown in the display area 208, the knowledge engineer 116 is capable of seeing how the proposed modification will affect "Cluster 1" as a whole. If the knowledge engineer 116 is not satisfied with the proposed modification, he or she may further adjust the decision criteria shown in the selection area 206 or adjust the focus area 238. The knowledge engineer 116 may also alter the display within the display area 208 by selecting an alternate display option in the GUI element 222. For example, the knowledge engineer 116 may choose to see all proposed modifications within the display area 208 shown in different colors. The first delta change may be displayed in blue, while the second delta change (having a higher weighted value) may be displayed in red. By using a predefined color representation, the knowledge engineer 116 is able to determine which proposed modification has the highest weighted value, but is also still able to see all proposed modifications as applied to the text of "Cluster 1".

If the knowledge engineer 116 is satisfied with the proposed modification shown in the display area 208 that has the highest weighted value, the knowledge engineer may select the button 212. Upon doing so, the host server 106 will apply the proposed modification to the knowledge entity for "Cluster 1" within the appropriate knowledge base 120A, 120B, or 120C. In one implementation, the processed delta changes and the knowledge entities will become display-only from the navigation area 204, so the knowledge engineer 116 can work on delta changes of other knowledge entities that fall into the same cluster. Such an approach can provide a visual aid for the knowledge engineer 116 to provide consistent information for similar contents across multiple knowledge entities. The knowledge engineer 116 may also re-open and edit the previous merged and processed knowledge entity. The new changes will be considered as a new version of the knowledge entity. In another implementation, the proposed modification may be applied to the knowledge entity in more than one of the knowledge bases 120A, 120B, and/or 120C. In one implementation, the host server 106 also stores the modification history and settings. For example, the host server 106 may store all of the settings of the field 250 and the sliding bars 252A, 252B, and 252C, as well as the setting of the focus area 238.

Figure 2C:
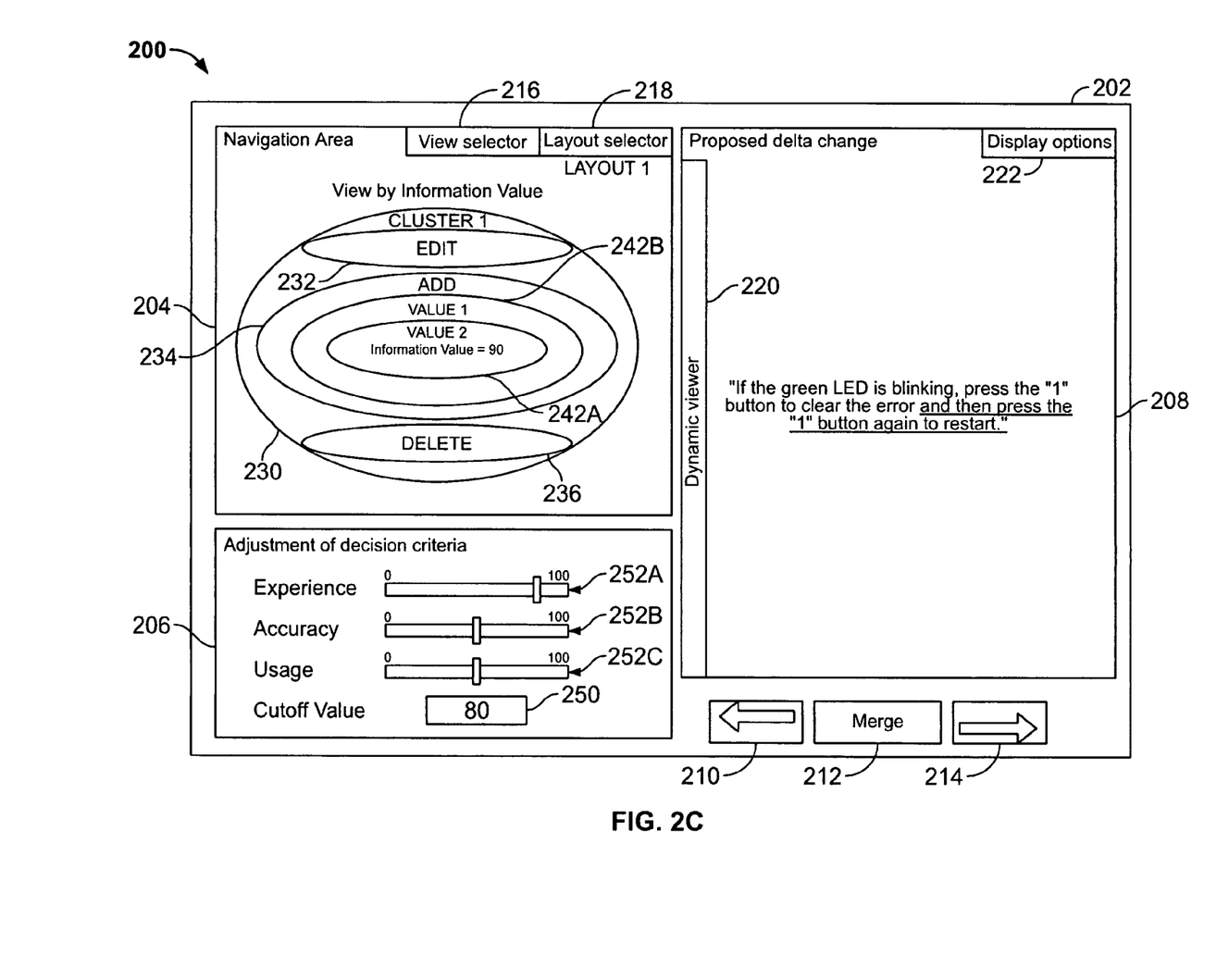

FIG. 2C shows an alternate view of the representations of the proposed modifications to "Cluster 1" within the navigation area 204. In FIG. 2B, the knowledge engineer 116 used the GUI element 216 to select a view of the representations within the navigation area 204 by delta change. As such, the proposed additional text associated with the first and second delta changes was displayed within the ovals 240B and 240A, respectively. In FIG. 2C, the knowledge engineer 116 has selected an alternate view of the representations within the navigation area 204 by information, or weighted, value. The oval 234 contains ovals 242A and 242B that represent two distinct weighted values. A first weighted value ("Value 1") is represented by the oval 242B and is associated with the first delta change ("Delta 1") that is represented by the oval 240B shown in FIG. 2B. A second weighted value ("Value 2") is represented by the oval 242A and is associated with the second delta change ("Delta 2") that is represented by the oval 240A. The oval 242A is displayed inside of the oval 242B to indicate that the second weighted value is greater than the first weighted value. As shown in FIG. 2C, the second weighted (or information) value is equal to "90".

In one implementation, edits include partial deletions of information from "Cluster 1" and deletions include only full deletion of the information from "Cluster 1". In this implementation, any proposed deletion (represented within the oval 236) will conflict with another proposed edit (represented within the oval 232) or addition (represented within the oval 234). Therefore, if an oval representing a proposed deletion within the oval 236 has a higher weighted value than an oval representing a proposed edit within the oval 232 or an oval representing a proposed addition within the oval 234, the proposed deletion will take precedence.

Figure 2D:
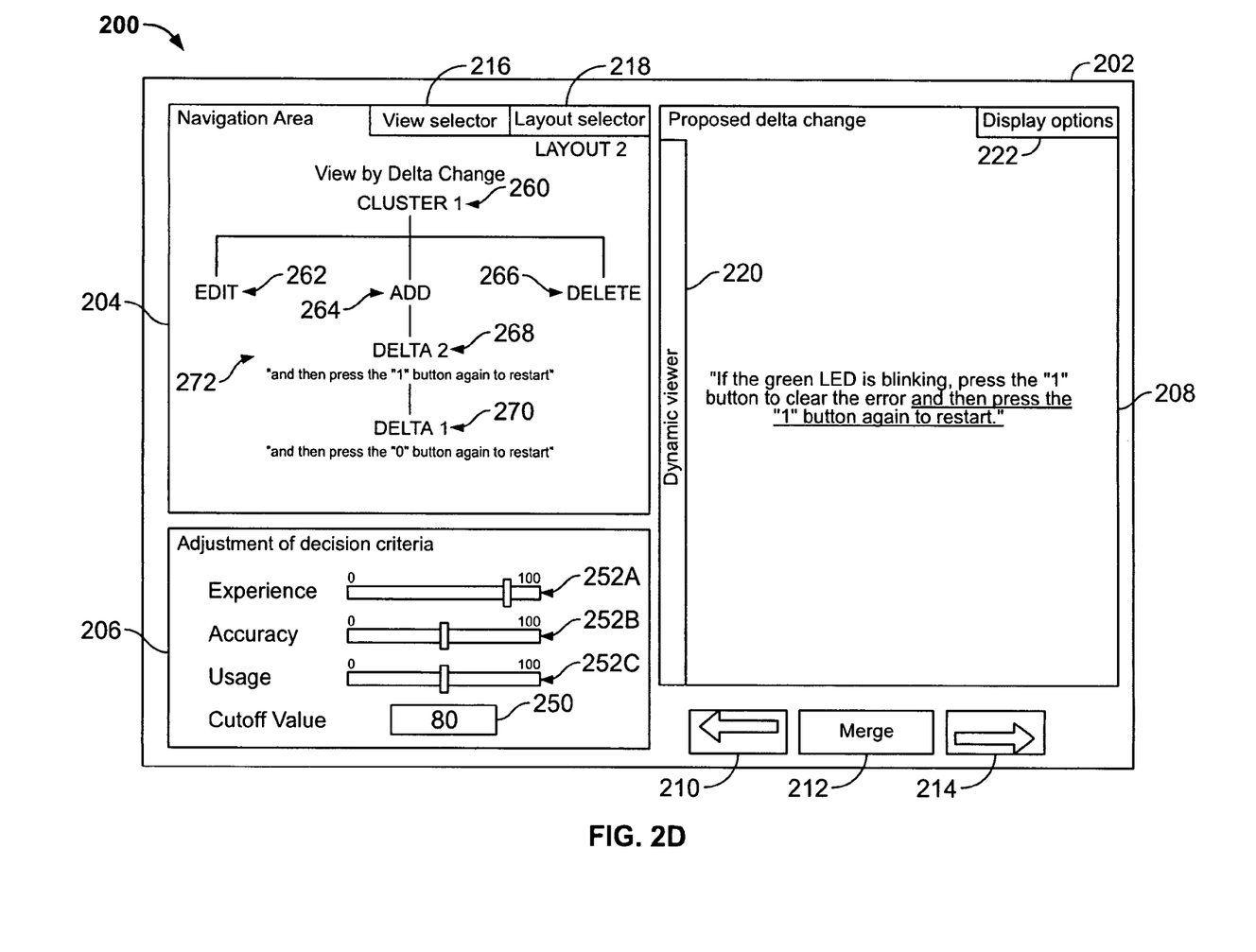

FIG. 2D shows an alternate layout of the representations of the proposed modifications to "Cluster 1" within the navigation area 204. In FIG. 2B, the knowledge engineer 116 used the GUI element 218 to select a layout of the representations within the navigation area 204 using ovals. As such, the proposed additional text associated with the first and second delta changes was displayed within the ovals 240B and 240A, respectively. In FIG. 2D, the knowledge engineer 116 has selected an alternate layout of the representations within the navigation area 204 using a tree layout 272 to display the delta changes. The tree layout 272 includes hierarchical nodes 260, 262, 264, 266, 268, and 270. The top node 260 represents the entire cluster, "Cluster 1". The first-level nodes 262, 264, and 266 represent edits, additions, and deletions of information within "Cluster 1". In the present example, there are two proposed modifications ("Delta 1" and "Delta 2") to "Cluster 1", which are each proposed additions of text. The second-level node 268 represents the proposed addition having the highest weighted, or information, value. As shown in FIG. 2D, the second proposed addition, "Delta 2", has the highest weighted value, and is therefore represented by the node 268. The first proposed addition, "Delta 1", has a lower weighted value, and is therefore represented by the third-level node 270. The text for each of the proposed additions is also displayed within the tree layout 272.

Figure 3:
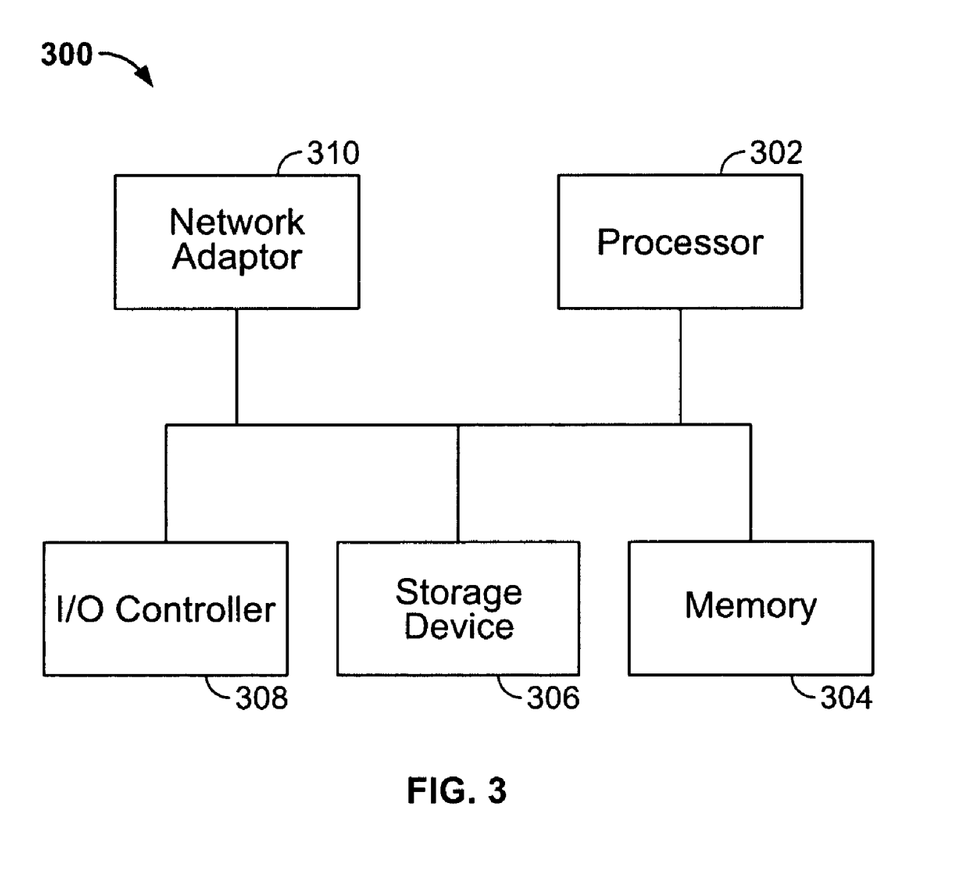
FIG. 3 is a block diagram of a computing device that may be included within the client devices or the host server shown in FIG. 1, according to one implementation.

FIG. 3 is a block diagram of a computing device 300 that may be included within the client devices 104A, 104B, 104C or the host server 106 shown in FIG. 1, according to one implementation. The computing device 300 includes a processor 302, a memory 304, a storage device 306, an input/output controller 308, and a network adaptowr 310. Each of the components 302, 304, 306, 308, and 310 are interconnected using a system bus. The processor 302 is capable of processing instructions for execution within the computing device 300. In one implementation, the processor 302 is a single-threaded processor. In another implementation, the processor 302 is a multi-threaded processor. The processor 302 is capable of processing instructions stored in the memory 304 or on the storage device 306 to display graphical information for a GUI on an external input/output device that is coupled to the input/output controller 308.

The memory 304 stores information within the computing device 300. In one implementation, the memory 304 is a computer-readable medium. In one implementation, the memory 304 is a volatile memory unit. In another implementation, the memory 304 is a non-volatile memory unit.

The storage device 306 is capable of providing mass storage for the computing device 300. In one implementation, the storage device 306 is a computer-readable medium. In various different implementations, the storage device 306 may be a floppy disk device, a hard disk device, an optical disk device, or a tape device.

In one implementation, a computer program product is tangibly embodied in an information carrier. The computer program product contains instructions that, when executed, perform one or more methods, such as those described above. The information carrier is a computer- or machine-readable medium, such as the memory 304, the storage device 306, or a propagated signal.

The input/output controller 308 manages input/output operations for the computing device 300. In one implementation, the input/output controller 308 is coupled to an external input/output device, such as a keyboard, a pointing device, or a display unit that is capable of displaying various GUI's, such as the GUI's shown in the previous figures, to a user.

The computing device 300 further includes the network adaptor 310. The computing device 300 uses the network adaptor 310 to communicate with other network devices. If, for example, the client device 104A is a mobile device that includes the computing device 300, the computing device 300 uses its network adaptor 310 to communicate with the host server 106 over a wireless connection.

A number of implementations have been described. Nevertheless, it will be understood that various modifications may be made without departing from the spirit and scope of these implementations. Accordingly, other implementations are within the scope of the following claims.

What is claimed is:

1. A method comprising:
  receiving a plurality of proposed modifications to a knowledge entity stored within a knowledge base on a host server, the proposed modifications being provided by distinct, discrete client devices external from the host server;
  displaying in a graphical user interface representations of the proposed modifications, the proposed modifications being spatially positioned to visually indicate that a conflict exists between the proposed modifications;
  generating weighted values for each of the proposed modifications based on user-inputted values for a plurality of user-adjustable decision criteria;
  comparing the weighted values against a cut-off value to generate a subset of the proposed modifications including first proposed modifications from the plurality of proposed modifications having weighted values above the cut-off value and the subset not including second proposed modifications having weighted values below the cut-off value; and
  displaying in the graphical user interface representations of the subset of the proposed modifications, the user-inputted values for the plurality of user-ajustable decision criteria inputted via the graphical user interface.

2. The method of claim 1, wherein the criteria comprises experience of users of the client devices, accuracy of users of the client devices, and usage history of proposed modifications of users.

3. The method of claim 1, wherein each of the client devices has a local cache of the knowledge base and the proposed modifications are based on modifications to the local cache that are synchronized with the host server by being pushed to the host server from the client devices.

4. The method of claim 1, wherein the graphical user interface includes user interface elements for a user to select to apply one of the subset of the proposed modifications.

5. The method of claim 1, wherein the proposed modifications are conflicting modifications to the knowledge entity and a user selection of one of the proposed modifications causes a mutually exclusive application of a selected, proposed modification such that other proposed modifications are no longer displayed for consideration for application by a user.

6. The method of claim 1, wherein the displaying causes displaying an indication of an ordering of the subset of the proposed modifications based on weighted values.

7. The method of claim 6, wherein the displaying of the ordering comprises displaying proposed modifications having a higher weighted value as circles within circles representing lesser weighted values that are conflicting.

8. A computer program product tangibly embodied in a computer-readable storage medium, the computer program product including instructions that, when executed, perform operations comprising:
  receiving a plurality of proposed modifications to a knowledge entity stored within a knowledge base on a host server, the proposed modifications being provided by distinct, discrete client devices external from the host server;
  displaying in a graphical user interface representations of the proposed modifications, the proposed modifications being spatially positioned to visually indicate that a conflict exists between the proposed modifications;
  generating weighted values for each of the proposed modifications based on user-inputted values for a plurality of user-adjustable decision criteria;

comparing the weighted values against a cut-off value to generate a subset of the proposed modifications including first proposed modifications from the plurality of proposed modifications having weighted values above the cut-off value and the subset not including second proposed modifications having weighted values below the cut-off value; and displaying in the graphical user interface representations of the subset of the proposed modifications, the user-inputted values for the plurality of user-adustable decision criteria inputted via the graphical user interface.

9. The computer program product of claim 8, wherein the criteria comprises experience of users of the client devices, accuracy of users of the client devices, and usage history of proposed modifications of users.

10. The computer program product of claim 8, wherein each of the client devices has a local cache of the knowledge base and the proposed modifications are based on modifications to the local cache that are synchronized with the host server by being pushed to the host server from the client devices.

11. The computer program product of claim 8, wherein the graphical user interface includes user interface elements for a user to select to apply one of the subset of the proposed modifications.

12. The computer program product of claim 8, wherein the proposed modifications are conflicting modifications to the knowledge entity and a user selection of one of the proposed modifications causes a mutually exclusive application of a selected, proposed modification such that other proposed modifications are no longer displayed for consideration for application by a user.

13. The computer program product of claim 8, wherein the displaying causes displaying an indication of an ordering of the subset of the proposed modifications based on weighted values.

14. The computer program product of claim 13, wherein the displaying of the ordering comprises displaying proposed modifications having a higher weighted value as circles within circles representing lesser weighted values that are conflicting.

15. A computer program product tangibly embodied in a computer-readable storage medium, the computer program product including instructions that, when executed, perform operations comprising:

receiving a plurality of proposed modifications to a knowledge entity stored within a knowledge base on a host server, the proposed modifications being provided by distinct, discrete client devices external from the host server, each of the client devices having a local cache of the knowledge base and the client devices pushing the proposed modifications to the host server based on a distributed model of the client devices and the host server;

displaying in a graphical user interface representations of the proposed modifications, the proposed modifications being spatially positioned to visually indicate that a conflict exists between the proposed modifications;

generating weighted values for each of the proposed modifications based on user-inputted values for a plurality of user-adustable decision criteria, the criteria comprising criteria defining metadata of users of the client devices from which to generate the weighted values;

comparing the weighted values against a cut-off value to generate a subset of the proposed modifications including first proposed modifications from the plurality of proposed modifications having weighted values above the cut-off value and the subset not including second proposed modifications having weighted values below the cut-off value; and displaying in the graphical user interface representations of the subset of the proposed modifications, the user-inputted values for the plurality of the user-adjustable decision criteria inputted via the graphical user interface, the displaying causing display of an indication of an ordering of the subset of the proposed modifications based on weighted values where proposed modifications having a higher weighted value are displayed as circles within circles representing lesser weighted values that are conflicting, and the graphical user interface includes user interface elements for a user to select to apply one of the subset of the proposed modifications to the exclusion of other proposed modifications such that other proposed modifications are no longer displayed for consideration for application by a user.

* * * * *